United States Patent [19]
Morimoto

[11] Patent Number: 6,094,412
[45] Date of Patent: Jul. 25, 2000

[54] OPTICAL INFORMATION STORAGE UNIT

[75] Inventor: Yasuaki Morimoto, Kawasaki, Japan

[73] Assignee: Fujitsu Limited, Kawasaki, Japan

[21] Appl. No.: 09/045,304

[22] Filed: Mar. 20, 1998

[30] Foreign Application Priority Data

Oct. 6, 1997 [JP] Japan ................................ 9-272864

[51] Int. Cl.[7] ........................... G11B 7/007; G11B 11/10
[52] U.S. Cl. ...................... 369/112; 369/44.23; 369/109; 369/110
[58] Field of Search ................. 369/112, 44.23, 369/44.14, 110, 44.39, 118, 109, 106, 44.24, 13, 121, 122

[56] References Cited

U.S. PATENT DOCUMENTS

| | | | |
|---|---|---|---|
| 4,822,151 | 4/1989 | Tatsuno et al. | 369/122 |
| 5,151,889 | 9/1992 | Saimi et al. | 369/33.37 |
| 5,243,583 | 9/1993 | Ohuchida et al. | 369/44.12 |
| 5,394,381 | 2/1995 | Fukumoto et al. | 369/13 |
| 5,477,386 | 12/1995 | Okuda et al. | 369/112 |
| 5,508,992 | 4/1996 | Hirose et al. | 369/109 |
| 5,523,994 | 6/1996 | Ando et al. | 369/112 |
| 5,623,462 | 4/1997 | Tezuka et al. | 369/44.23 |

FOREIGN PATENT DOCUMENTS

| | | |
|---|---|---|
| 63-129529 | 6/1988 | Japan . |
| 3-3135 | 1/1991 | Japan . |
| 5-142420 | 6/1993 | Japan . |
| 6-68540 | 3/1994 | Japan . |
| 6-124463 | 5/1994 | Japan . |
| 6-314438 | 11/1994 | Japan . |
| 7-110960 | 4/1995 | Japan . |
| 7-182713 | 7/1995 | Japan . |
| 8-211206 | 8/1996 | Japan . |
| 9-17016 | 1/1997 | Japan . |

OTHER PUBLICATIONS

Current Status & Future of Magneto–Optical Disks, Nobutaka Imamura, MO Disk, Japan, Aug. 21, 1996, pp. 54–55.

*Primary Examiner*—Tan Dinh
*Assistant Examiner*—Kim-Kwok Chu
*Attorney, Agent, or Firm*—Greer, Burns & Crain, Ltd.

[57] ABSTRACT

An optical information storage unit is provided with a light source, a polarization beam splitter reflecting and irradiating a bundle of rays emitted from the light source onto a recording surface of a recording medium, and an optical element receiving a convergent light reflected by the recording surface and passed through the polarization beam splitter, and having an infinite focal distance with a convergent point of the convergent light that is variable.

14 Claims, 14 Drawing Sheets

MAGNETO-OPTIC SIGNAL

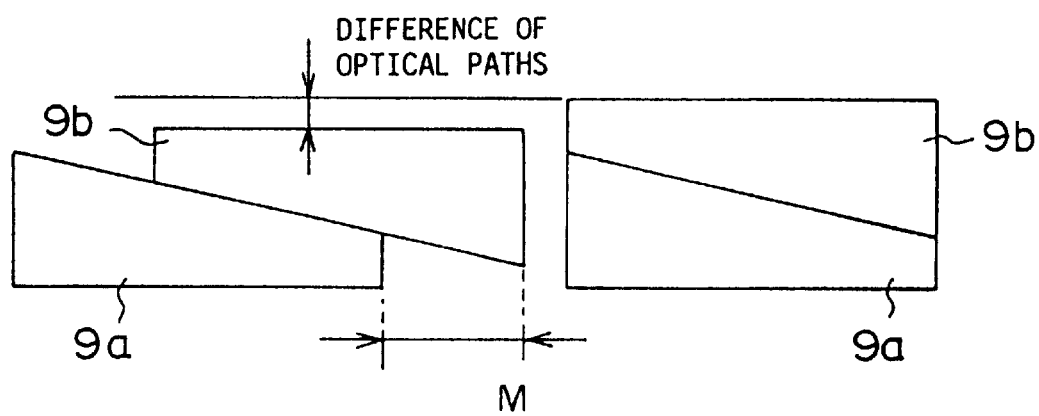

OPTICAL INFORMATION STORAGE UNIT

BACKGROUND OF THE INVENTION

The present invention generally relates to optical information storage units, and more particularly to an optical information storage unit which is capable of adjusting a focal offset and is suited for recording and reproducing a magneto-optic signal on and from a recording medium.

In this specification, an "information storage unit" refers to an apparatus which records information on and/or reproduces information from a recording medium.

In an optical information storage unit, a bundle of rays emitted from a light source is reflected by a polarization beam splitter and is irradiated on a recording surface of an optical recording medium. The bundle of rays reflected by the recording surface of the optical recording medium passes through the polarization beam splitter and is directed towards a photodetector. When the reflected bundle of rays from the optical recording medium passes through the polarization beam splitter, astigmatism is generated, and a focal error signal can be generated by use of this astigmatism. Conventionally, a cube-shaped polarization beam splitter is generally used as the polarization beam splitter.

FIG. 1 is a diagram showing an important part of an example of a conventional optical information storage unit. In FIG. 1, a bundle of rays emitted from a light source 14 is converted into parallel rays by a collimator lens 15, and supplied to a cube-shaped polarization beam splitter 16 as a P-polarized light. The bundle of rays supplied to the polarization beam splitter 16 is transmitted through and is reflected by the polarization beam splitter 16 depending on a polarization characteristic of the polarization beam splitter 16.

The bundle of rays transmitted through the polarization beam splitter 16 is converged to a diffraction limit by an objective lens 17, and is irradiated on a recording surface of a magneto-optic recording medium 18. The bundle of rays reflected by the recording surface of the magneto-optic recording medium 18 again passes through the objective lens 17, is reflected by the polarization beam splitter 16, and is then supplied to a convergent lens 19. The convergent lens 19 converts the bundle of rays reflected by the polarization beam splitter 16 into a convergent light, and supplies the convergent light to a cylindrical lens 20. Astigmatism is generated as the convergent light passes through this cylindrical lens 20. The astigmatism which is generated is used to generate a focal error signal. The convergent lens 19 has an adjustable structure for enabling adjustment of an offset of the focal error signal, and the convergent lens 19 is adjustable in a direction of an optical axis along which the bundle of rays travel.

The bundle of rays passed through the cylindrical lens 20 further passes through a Wollaston prism 21 where the bundle of rays is separated into 2 polarized light components having electrical vectors in mutually perpendicular directions and 1 polarized light component in which the 2 polarized light components coexist. The total of 3 polarized light components obtained from the Wollaston prism 21 are supplied to a photodetector 22.

FIG. 2 is a plan view showing the construction of the photodetector 22. The photodetector 22 includes a 4-part detector 22a, a detector 22b, and a detector 22c. The 2 polarized light components having the electrical vectors in mutually perpendicular directions are respectively supplied to the detectors 22b and 22c and are subjected to a photoelectric conversion. Output detection signals of these detectors 22b and 22c are converted into a magneto-optic signal via a differential amplifier 230. On the other hand, the 1 polarized light component in which the 2 polarized light components coexist is supplied to the 4-part detector 22a and is subjected to a photoelectric conversion. The focal error signal is generated based on output detection signals of 4 detector parts of the 4-part detector 22a.

The conventional optical information storage unit uses an expensive cube-shaped polarization beam splitter as the polarization beam splitter 16. Furthermore, the bundle of rays emitted from the light source 14 is supplied to the polarization beam splitter 16 after being converted into the parallel rays by the collimator lens 15. For this reason, the bundle of rays remains in the state of the parallel rays even when being directed towards an optical system which detects the magneto-optic signal, and the convergent lens 19 is inevitably required in order to generate the focal error signal.

In order to enable omission of the convergent lens 19, it is conceivable to supply a divergent bundle of rays emitted from the light source 14 as it is to the polarization beam splitter 16 and thereafter convert the divergent bundle of rays into the parallel rays. But in order to obtain a laser power that is required to carry out the recording using this conceivable method, a numerical aperture of the collimator lens 15 cannot be made small, and as a result, a focal distance of the collimator lens 15 becomes restricted. Therefore, it is necessary to provide a concave lens in order to obtain a sufficiently high focal error detection sensitivity, and it is difficult to reduce the number of optical parts.

On the other hand, it is also conceivable to use as the polarization beam splitter 16 an inexpensive plate-shaped polarization beam splitter in place of the expensive cube-shaped polarization beam splitter. However, the focal distance of the collimator lens 15 becomes restricted in this case, and it is difficult to secure a sufficiently large space for arranging the plate-shaped polarization beam splitter between the light source 14 and the collimator lens 15.

In addition, some kind of means must be provided to correct an offset of the focal error signal, but the conventional optical information storage unit adjusts the offset by moving a concave lens or a convex lens in a direction along the optical axis. Consequently, when a positional error of an optical element occurs due to a change in the environment such as a temperature change, there was a problem in that it is impossible to generate a stable focal error signal.

SUMMARY OF THE INVENTION

Accordingly, it is a general object of the present invention to provide a novel and useful optical information storage unit in which the problems described above are eliminated.

Another and more specific object of the present invention to provide an optical information storage unit which can adjust a focal offset by use of a relatively simple and inexpensive structure, and can generate a stable focal error signal according to various kinds of focal error detection methods even when the environment changes.

Still another object of the present invention is to provide an optical information storage unit comprising a light source, a polarization beam splitter reflecting and irradiating a bundle of rays emitted from the light source onto a recording surface of a recording medium, and an optical element receiving a convergent light reflected by the recording surface and passed through the polarization beam splitter, and having an infinite focal distance with a convergent point of the convergent light that is variable. According to the optical information storage unit of the present invention, a focal offset can be adjusted by use of a relatively simple and inexpensive structure, and a stable focal error signal can be generated according to various kinds of focal error detection methods even when the environment changes.

The optical information storage unit may further comprise first condenser means for reducing a diverging angle of a divergent bundle of rays emitted from the light source and making the polarization beam splitter reflect the divergent bundle of rays.

The optical information storage unit may further comprise second condenser means for converting the bundle of rays reflected by the polarization beam splitter into parallel rays, and an objective lens converging the parallel rays to a diffraction limit, where the first condenser means comprises a first condenser lens having a first numerical aperture, and the second condenser means comprises a second condenser lens having a second numerical aperture smaller than the first numerical aperture.

In the optical information storage unit, the optical element may comprise a Wollaston prism made up of two crystal optical elements.

In the optical information storage unit, the Wollaston prism may be inclined with respect to a plane which is perpendicular to a light incident surface of the polarization beam splitter and includes an optical axis along which the bundle of rays travels.

In the optical information storage unit, the Wollaston prism may be inclined with respect to a light incident surface of the polarization beam splitter.

In the optical information storage unit, the two crystal optical elements of the Wollaston prism may be movable relative to each other so that a traveling distance of the bundle of rays passing through the Wollaston prism is variable.

In the optical information storage unit, the polarization beam splitter may comprise a plate-shaped polarization beam splitter.

Other objects and further features of the present invention may be apparent from the following detailed description when read in conjunction with the accompanying drawings.

BRIEF DESCRIPTION OF THE DRAWINGS

FIGS. 11A and 11B respectively are plan views for explaining the Wollaston prism in a case where the crystal optical elements contact each other and are movable relative to each other;

DESCRIPTION OF THE PREFERRED EMBODIMENTS

Figure 1:
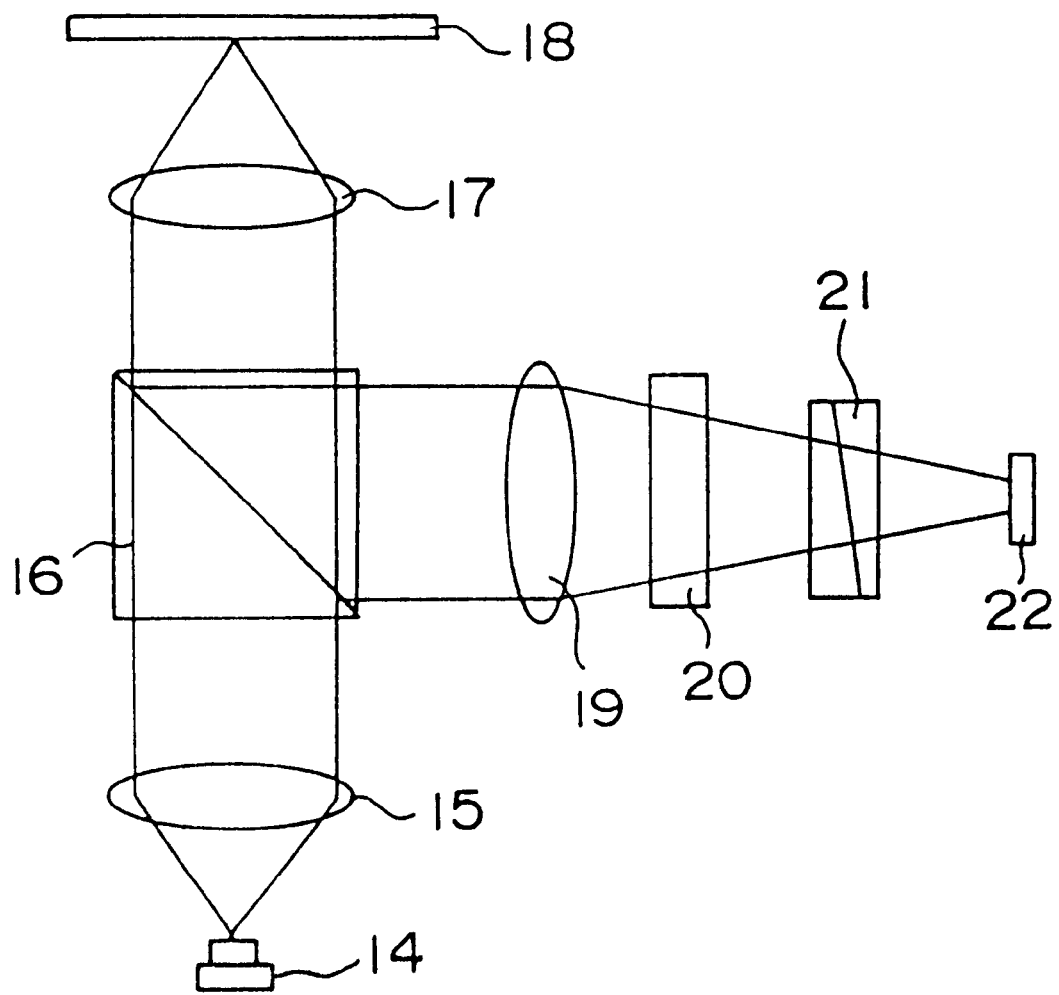
FIG. 1 is a diagram showing an important part of an example of a conventional optical information storage unit.
Figure 2:
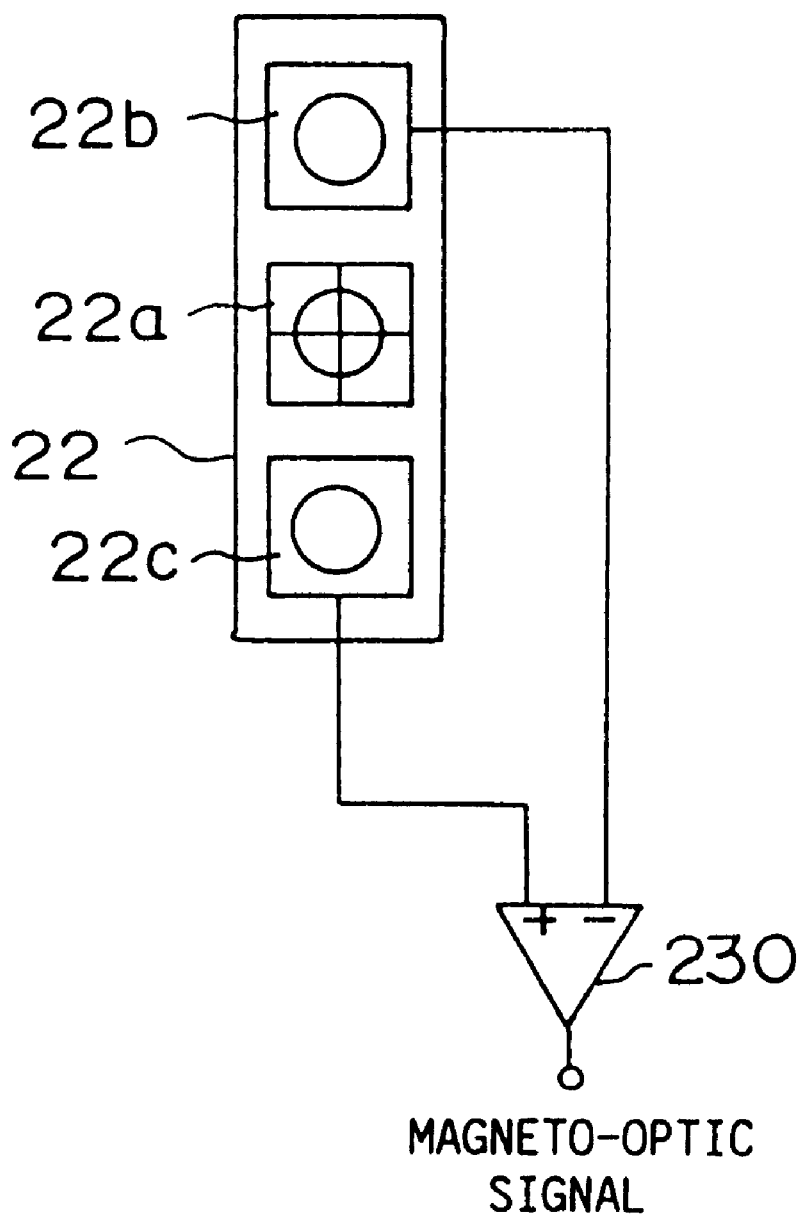
FIG. 2 is a plan view showing the construction of a photodetector.
Figure 3:
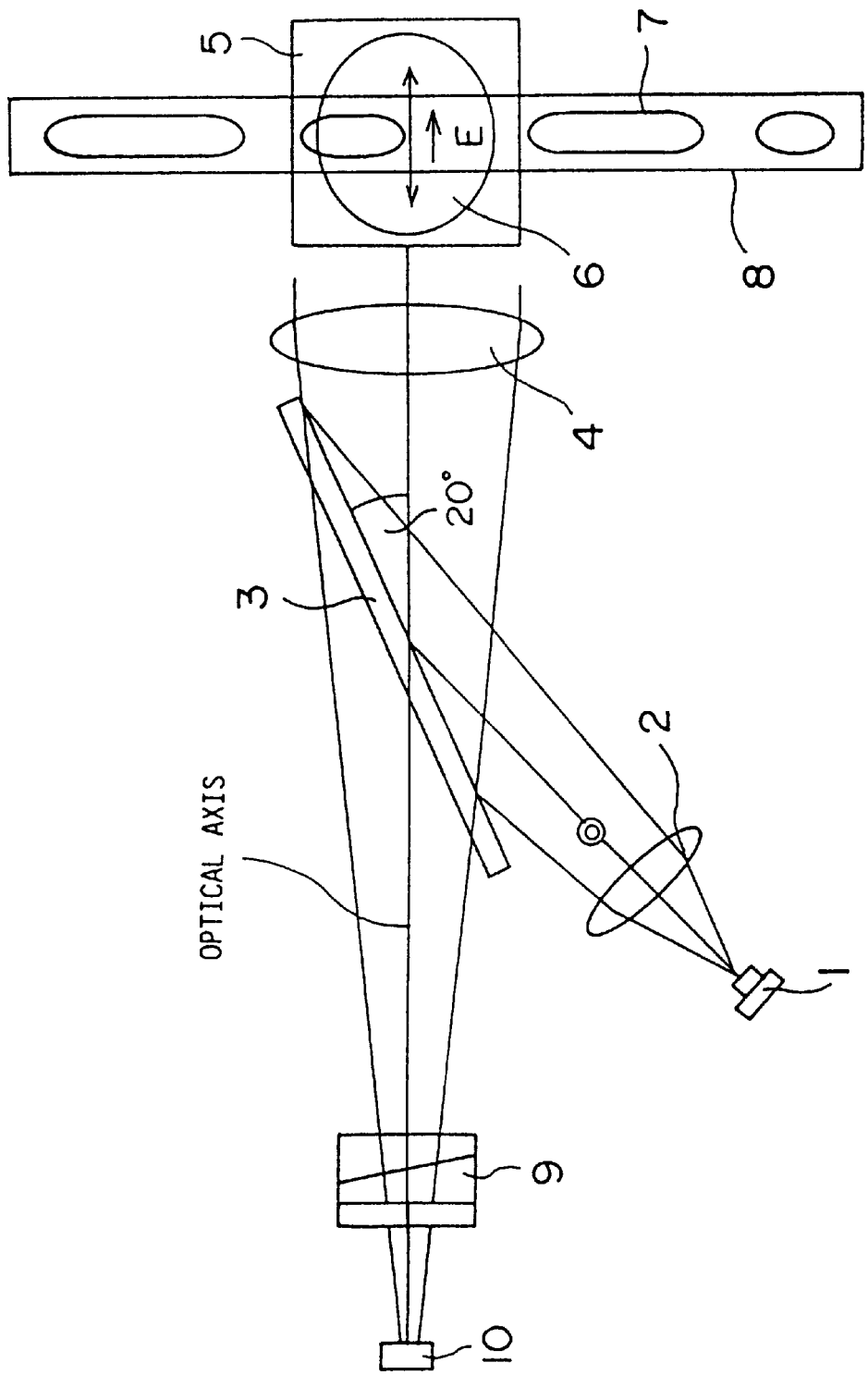
FIG. 3 is a plan view showing the general construction of a first embodiment of an optical information storage unit according to the present invention.

FIG. 3 is a plan view showing the general construction of a first embodiment of an optical information storage unit according to the present invention. In FIG. 3, a divergent bundle of rays emitted from a semiconductor laser 1 is reduced of its divergent angle to a certain extent by a condenser lens 2 and passes through this condenser lens 2. The bundle of rays passed through the condenser lens 2 is reflected by a plate-shaped polarization beam splitter 3 in a state of a P-polarized light. In the case where the polarization beam splitter 3 is made of a plate-shaped polarization beam splitter, the polarization beam splitter 3 is made of a flat plate-shaped glass and a beam splitting layer formed on the plate-shaped glass. In this embodiment, the polarization beam splitter 3 is inclined by approximately 20° with respect to an optical axis, and a center of the bundle of rays incident to the polarization beam splitter 3 has an incident angle of approximately 70° with respect to the optical axis. In addition, an incident angle of the divergent bundle of rays incident to the polarization beam splitter 3 is set to fall within approximately 65° to approximately 75°.

The bundle of rays reflected by the polarization beam splitter 3 is supplied to a condenser lens 4 and is converted into parallel rays. The parallel rays from the condenser lens 4 are reflected by a mirror 5 and supplied to an objective lens 6. The objective lens 6 converges the parallel rays to a diffraction limit, so as to irradiate a track 8 formed on a recording surface of a magneto-optic recording medium and record a magnetic domain 7 on the track 8 or, to irradiate the track 8 and reproduce the magnetic domain 7 recorded on the track 8. In this embodiment, a magneto-optic disk is used as the magneto-optic recording medium.

The bundle of rays reflected by the track 8 again passes through the objective lens 6 and the condenser lens 4, and is transmitted through the polarization beam splitter 3 depending on a polarization characteristic of the polarization beam splitter 3. The bundle of rays transmitted through the polarization beam splitter 3 is transmitted through a Wollaston prism 9 which is inclined with respect to a plane which is perpendicular to an incident surface or plane of incidence of the polarization beam splitter 3 and is includes the optical axis.

The Wollaston prism 9 is made up of parallepiped or cube shaped crystal blocks which are connected to each other at a plane where the optical axes of the two crystals form an angle with respect to an incident surface thereof. Since the Wollaston prism 9 is adjusted to an infinite focal point, the blocks may be fixed by bonding after the adjustment.

Figure 4:
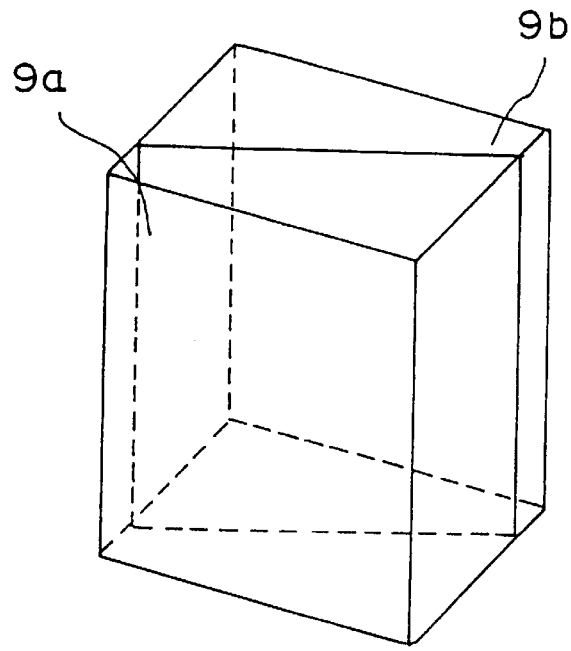
FIG. 4 is a perspective view showing a Wollaston prism.
Figure 5:
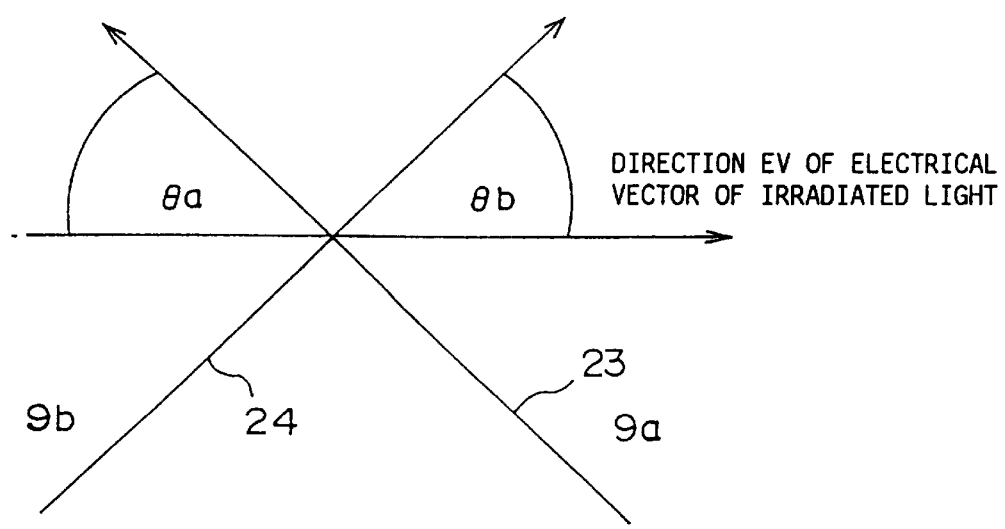
FIG. 5 is a diagram showing the relationship of crystal optical axes of 2 optical crystal elements forming the Wollaston prism.
Figure 6:
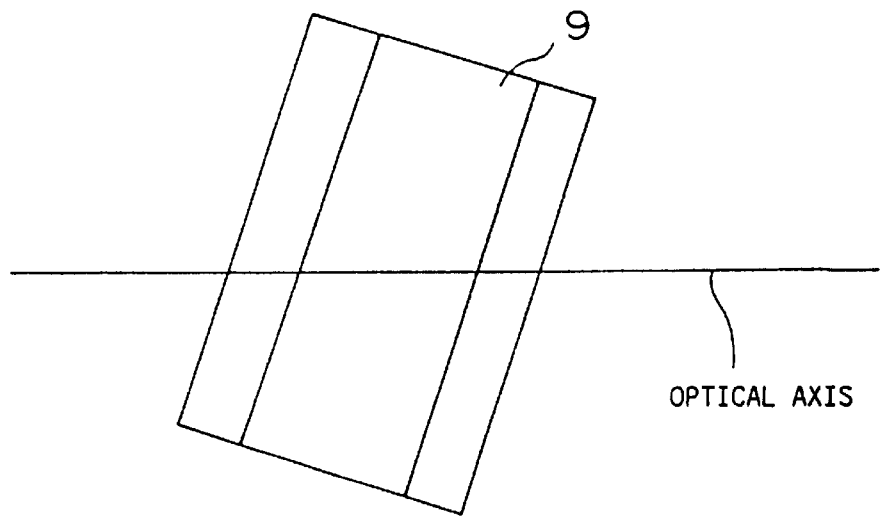
FIG. 6 is a diagram for explaining the position of the Wollaston prism with respect to an optical axis.

FIGS. 4 through 6 are diagrams for explaining a relationship of crystal optical axes of 2 optical elements forming the Wollaston prism 9. FIG. 4 is a perspective view showing the Wollaston prism 9. FIG. 5 is a diagram showing the relationship of the crystal optical axes of the 2 optical crystal elements forming the Wollaston prism 9. In addition, FIG. 6 is a diagram for explaining a position of the Wollaston prism 9 with respect to the optical axis, viewed from a position parallel to the paper in FIG. 3.

As shown in FIG. 4, the Wollaston prism 9 includes 2 optical crystal elements 9a and 9b. In addition, as shown in FIG. 5, a crystal optical axis 23 of he optical crystal element 9a forms an angle θa with respect to a direction EV of an electrical vector of the irradiated light, and a crystal optical axis 24 of the optical crystal element 9b forms an angle θb with respect to the direction EV of the electrical vector of the irradiated light. In this embodiment, θa=θb, and the crystal optical axes 23 and 24 of the optical crystal elements 9a and 9b are symmetrical with respect to the direction EV of the electrical vector of the irradiated light.

In a case where θa=θb=45°, the Wollaston prism 9 has a function of separating the irradiated light into only a P-polarized light component and a S-polarized light component having mutually perpendicular electrical vectors. In addition, in a case where the angles θa and θb are other than 45°, the Wollaston prism 9 has a function of separating the irradiated light into 3 bundles of rays, that is, a P-polarized light component and a S-polarized light component having mutually perpendicular electrical vectors and a mixed light component in which the P-polarized light component and the S-polarized light component coexist.

As may be seen from FIGS. 5 and 6, it is possible to eliminate the astigmatism generated by the polarization beam splitter 3 by arranging the Wollaston prism 9 in an inclined position. Hence, this embodiment employs a spot size detection method (hereinafter simply referred to as a SSD method) to generate the focal error signal. More particularly, as will be described hereunder, the SSD is used to detect the mixed light component (bundle of rays) appearing at a central portion of a photodetector 10, in which mixed light component the P-polarized light component and the S-polarized light component coexist.

Figure 7:
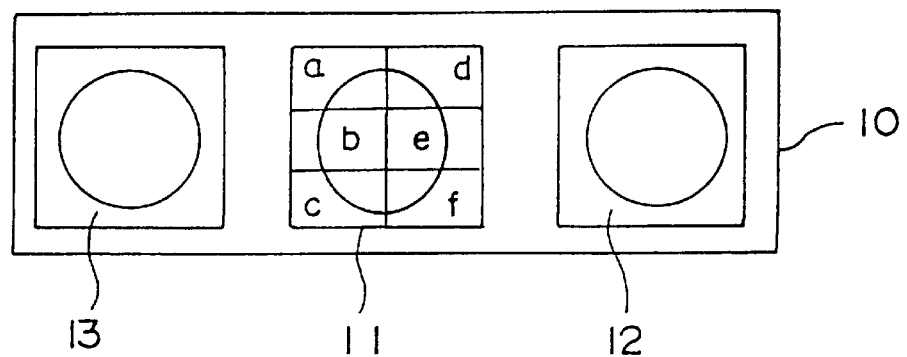
FIG. 7 is a plan view showing the construction of a photodetector.

FIG. 7 is a plan view showing the construction of the photodetector 10. In FIG. 7, the photodetector 10 includes a 6-part detector 11, a detector 12, and a detector 13. The P-polarized light component and the S-polarized light component having mutually perpendicular electrical vectors are respectively supplied to the detectors 12 and 13. On the other hand, the P-polarized light component and the S-polarized light component having mutually perpendicular electrical vectors, and the mixed light component in which the P-polarized light component and the S-polarized light component coexist, are supplied to the 6-part detector 11 which is arranged at a central portion of the photodetector 10. The 6-part detector 11 includes 6 detector parts $\underline{a}$ through $\underline{f}$.

If output detection signals of the 6 detector parts $\underline{a}$ through $\underline{f}$ of the 6-part detector 11 are respectively denoted by $\underline{a}$ through $\underline{f}$, the focal error signal (FES) can be obtained by calculating (a+b+c+f)−(b+e) according to the SSD method. In addition, it is possible to obtain a tracking error signal (TES) which is a push-pull signal, by calculating (a+b+c)−(d+e+f). On the other hand, a magneto-optic signal (MO) can be obtained by differentially amplifying output detection signals of the detectors 12 and 13.

Figure 8:
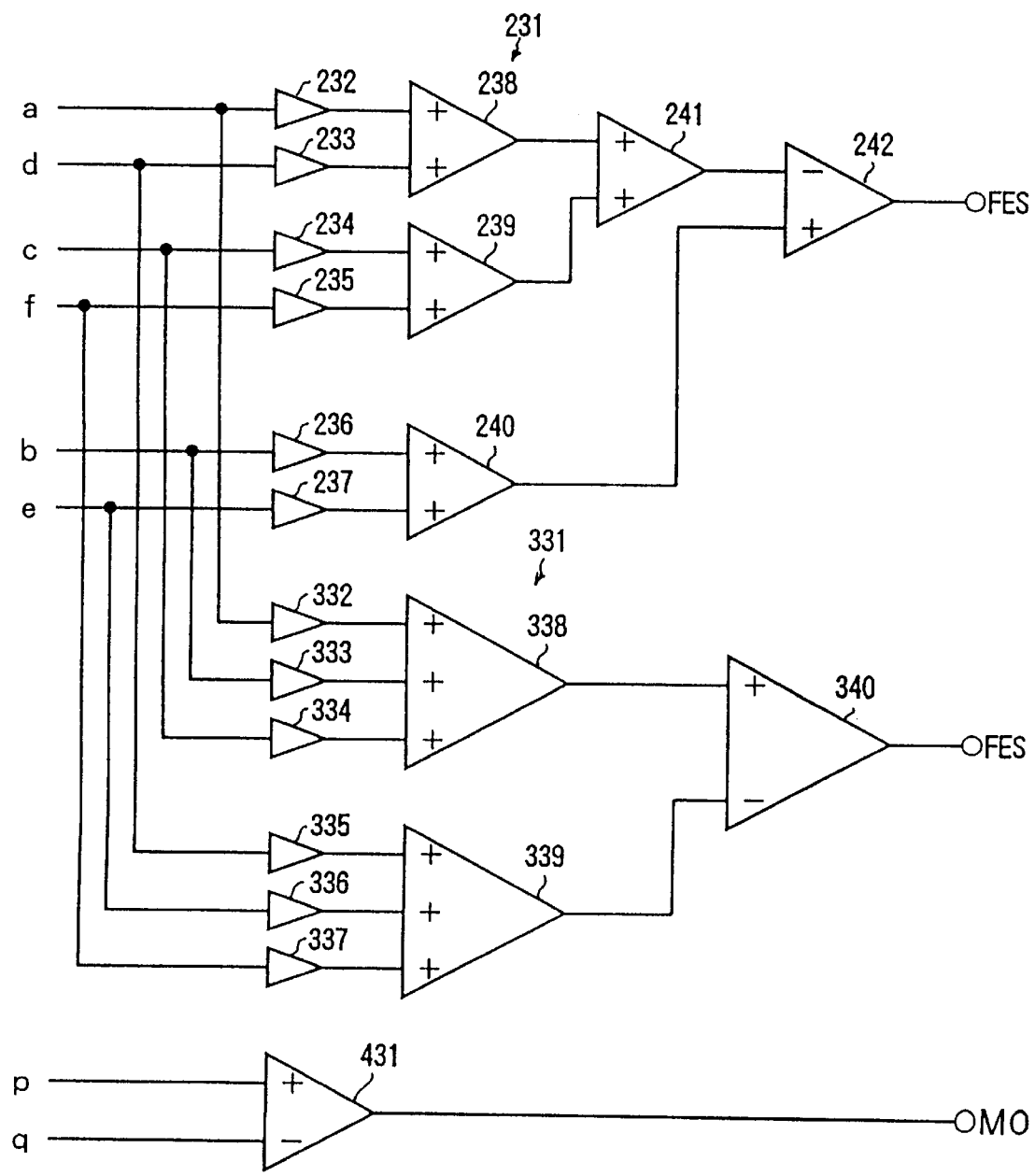
FIG. 8 is a circuit diagram showing an embodiment of a focal error detection system a tracking error detection system and a magneto-optic signal detection system.

FIG. 8 is a circuit diagram showing an embodiment of a detection system which reproduces the focal error signal, the tracking error signal and the magneto-optic signal from the output detection signals of the photodetector 10 shown in FIG. 7. In FIG. 8, the detection system includes a focal error detection system 231, a tracking error detection system 331, and a differential amplifier 431 which forms a magneto-optic signal detection system.

The focal error detection system 231 includes amplifiers 232 through 237, operational amplifiers (adding circuits) 238 through 240, and a differential amplifier (subtracting circuit) 242 which are connected as shown in FIG. 8. The operational amplifier 238 receives the output detection signals $\underline{a}$ and $\underline{d}$ of the detector parts $\underline{a}$ and $\underline{d}$ of the 6-part detector 11 via the respective amplifiers 232 and 233, and supplies an added result to the operational amplifier 241. The operational amplifier 239 receives the output detection signals $\underline{c}$ and $\underline{f}$ of the detector parts $\underline{c}$ and $\underline{f}$ of the 6-part detector 11 via the respective amplifiers 234 and 235, and supplies an added result to the operational amplifier 241. The operational amplifier 241 adds the added results from the operational amplifiers 238 and 239, and supplies an added result to the differential amplifier 242. On the other hand, the operational amplifier 240 receives the output detection signals $\underline{b}$ and $\underline{e}$ of the detector parts $\underline{b}$ and $\underline{e}$ of the 6-part detector 11 via the respective amplifiers 236 and 237, and supplies an added result to the differential amplifier 242. The differential amplifier 242 subtracts the output of the operational amplifier 240 from the output of the operational amplifier 241, and outputs the focal error signal.

The tracking error detection system 331 includes amplifiers 332 through 337, operational amplifiers (adding circuits) 338 and 339, and a differential amplifier (subtracting circuit) 340 which are connected as shown in FIG. 8. The operational amplifier 338 receives the output detection signals $\underline{a}$ through $\underline{c}$ of the detector parts $\underline{a}$ through $\underline{c}$ of the 6-part detector 11 via the respective amplifiers 332 through 334, and supplies an added result to the differential amplifier 340. The operational amplifier 339 receives the output detection signals $\underline{d}$ through $\underline{f}$ of the detector parts $\underline{d}$ through $\underline{f}$ of the 6-part detector 11 via the respective amplifiers 335 through 337, and supplies an added result to the differential amplifier 340. The differential amplifier 340 subtracts the output of the operational amplifier 339 from the output of the operational amplifier 338, and outputs the tracking error signal.

In the magneto-optic signal detection system, the differential amplifier 431 subtracts an output detection signal $\underline{q}$ of the detector 13 from an output detection signal $\underline{p}$ of the detector 12, and outputs the magneto-optic signal.

Figure 9:
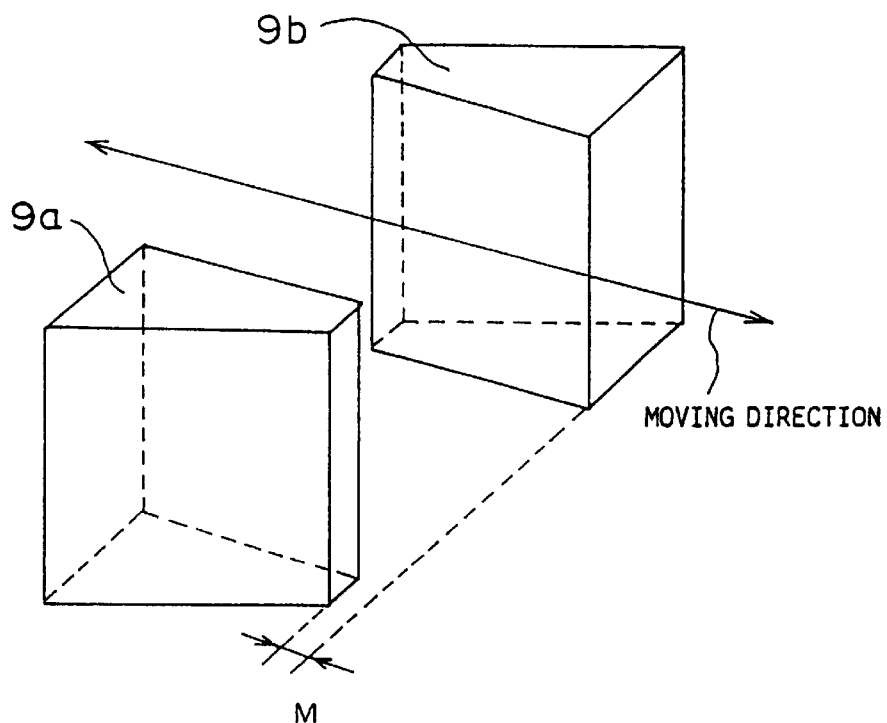
FIG. 9 is a perspective vie showing the crystal optical elements forming the Wollaston prism.
Figure 10:
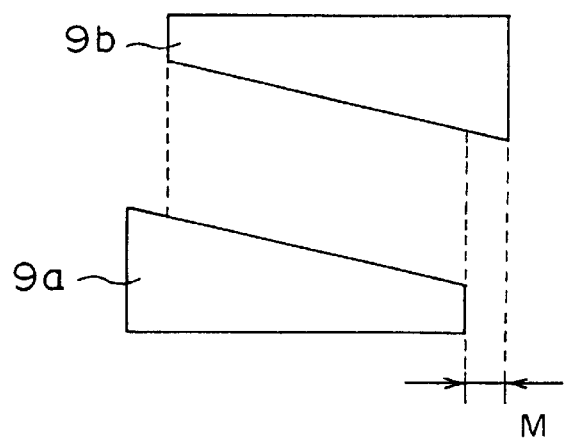
FIG. 10 is a plan view, viewed from above, showing a stage where the crystal optical elements have moved relative to each other.

In this embodiment, the crystal optical elements 9a and 9b forming the Wollaston prism 9 are not fixed to each other by bonding. In other words, as shown in FIG. 9, the crystal optical element 9a and the crystal optical element 9b are movable relative to each other in directions indicated by arrows in FIG. 9. FIG. 9 is a perspective view showing the crystal optical elements 9a and 9b forming the Wollaston prism 9, and a relative moving quantity is indicated by M. FIG. 10 is a plan view from above showing a state where the crystal optical elements 9a and 9b have moved relative to each other. The bundle of rays obtained via the polarization beam splitter 3 passes through a portion where the crystal optical elements 9a and 9b overlap, and reaches the photodetector 10. In FIGS. 9 and 10, the crystal optical elements 9a and 9b are separated from each other along the optical axis.

FIGS. 11A and 11B respectively are plan views for explaining the Wollaston prism 9 in a case where the crystal optical elements 9a and 9b contact each other and are movable relative to each other. FIG. 11A shows a state where the crystal optical elements 9a and 9b essentially overlap each other completely, and FIG. 11B shows a state where the crystal optical elements 9a and 9b have moved the moving quantity M relative to each other. In FIGS. 11A and 11B, a difference is introduced in optical paths of the convergent light incident to the Wollaston prism 9 depending on the relative positions of the crystal optical elements 9a and 9b, as may be seen from a comparison of FIGS. 11A and 11B. A convergent point of the convergent light incident to the Wollaston prism 9 moves depending on this difference introduced in the optical paths of the convergent light.

Figures 12A, 12B:
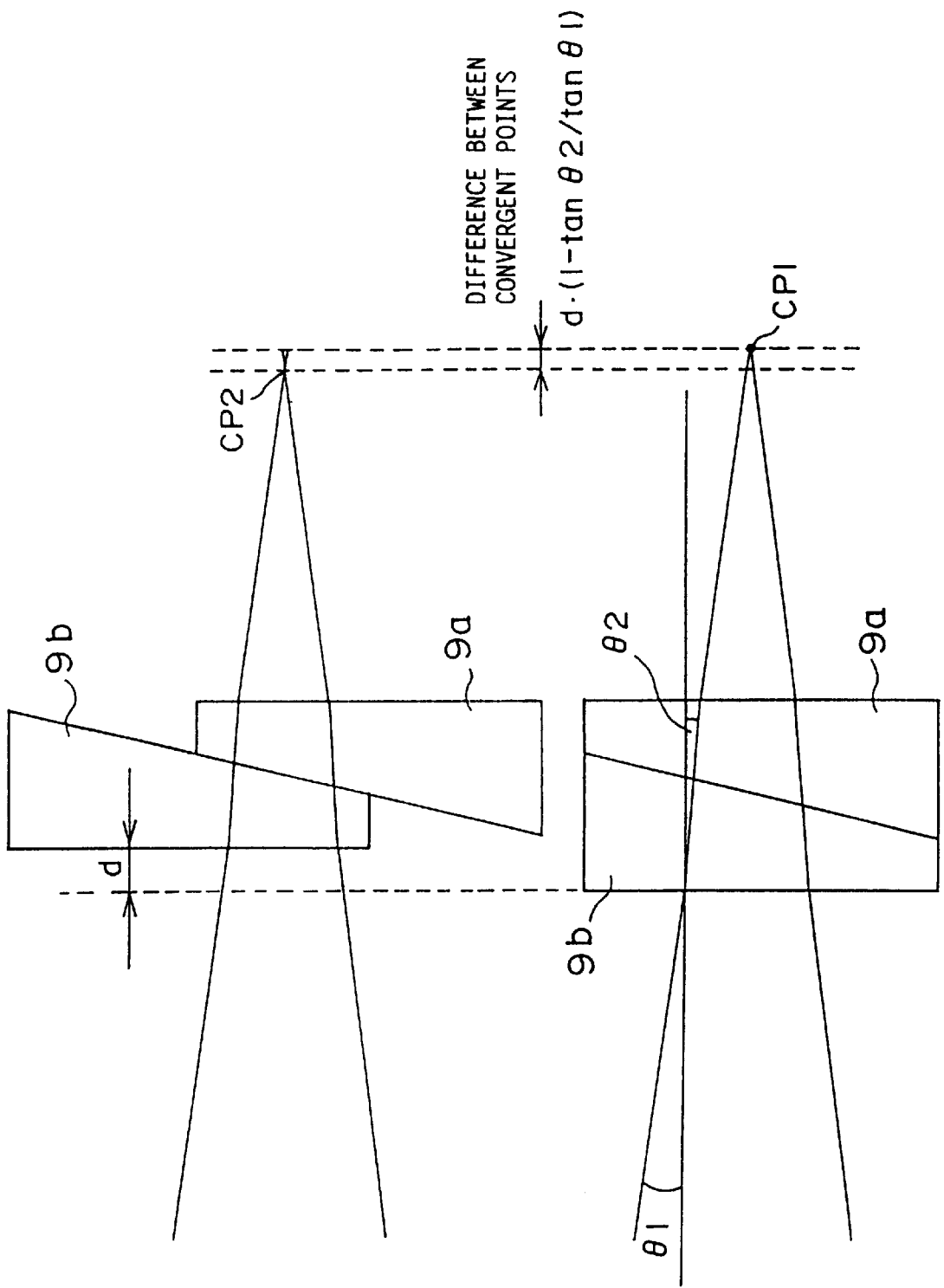
FIGS. 12A and 12B respectively are plan views for explaining how a convergent point of a convergent light incident to the Wollaston prism moves depending on the relative positions of the crystal optical elements.

FIGS. 12A and 12B respectivelt are plan views for explaining how the convergent point of the convergent light incident to the Wollaston prism 9 moves depending on the relative positions of the crystal optical elements 9a and 9b. FIG. 12A shows a state where the crystal optical elements 9a and 9b overlap completely, and FIG. 12B shows a state where the crystal optical elements 9a and 9b have moved relative to each other and the amount of overlap is approximately ½ that of the state shown in FIG. 12A. As may be seen from a comparison of FIGS. 12A and 12B, the convergent point of the convergent light incident to the Wollaston prism 9 shifts according to Snell's law based on the amount of overlap between the crystal optical elements 9a and 9b. In other words, the convergent point is located at a position CP1 in FIG. 11A, but the convergent point moves to a position CP2 in FIG. 11B.

An angle of refraction of the Wollaston prism 9 can be described by $\theta2=A\sin((\sin\theta1)/n)$, and a difference between the positions CP1 and CP2 of the convergent point in a direction along the optical axis can be described by $D=d\cdot(1-\tan\theta2/\tan\theta1)$, if a change in the thickness of an overlapping region of the crystal optical elements 9a and 9b of the Wollaston prism 9 is denoted by d, an incident angle of the convergent light incident to the Wollaston prism 9 is denoted by $\theta1$, the angle of refraction of the Wollaston prism 9 is denoted by $\theta2$, an average refractive index of the Wollaston prism 9 is denoted by n, a constant is denoted by A, and the difference between the positions CP1 and CP2 of the convergent point in the direction along the optical axis is denoted by D. Accordingly, it is possible to make an offset adjustment of the focal error signal by utilizing the difference D between the positions CP1 and CP2 of the convergent point in the direction along the optical axis. This offset adjustment may be performed at the time of assembling the optical information storage unit or, at the time of maintenance which is carried out depending on vibrations, changes that occur with time and the like.

FIGS. 12A and 12B show a case where the main ray is incident approximately perpendicularly to the incident surface of the Wollaston prism 9. However, effects similar to those described above are of course also obtainable in cases where the main ray is inclined to the incident surface.

Figure 13:
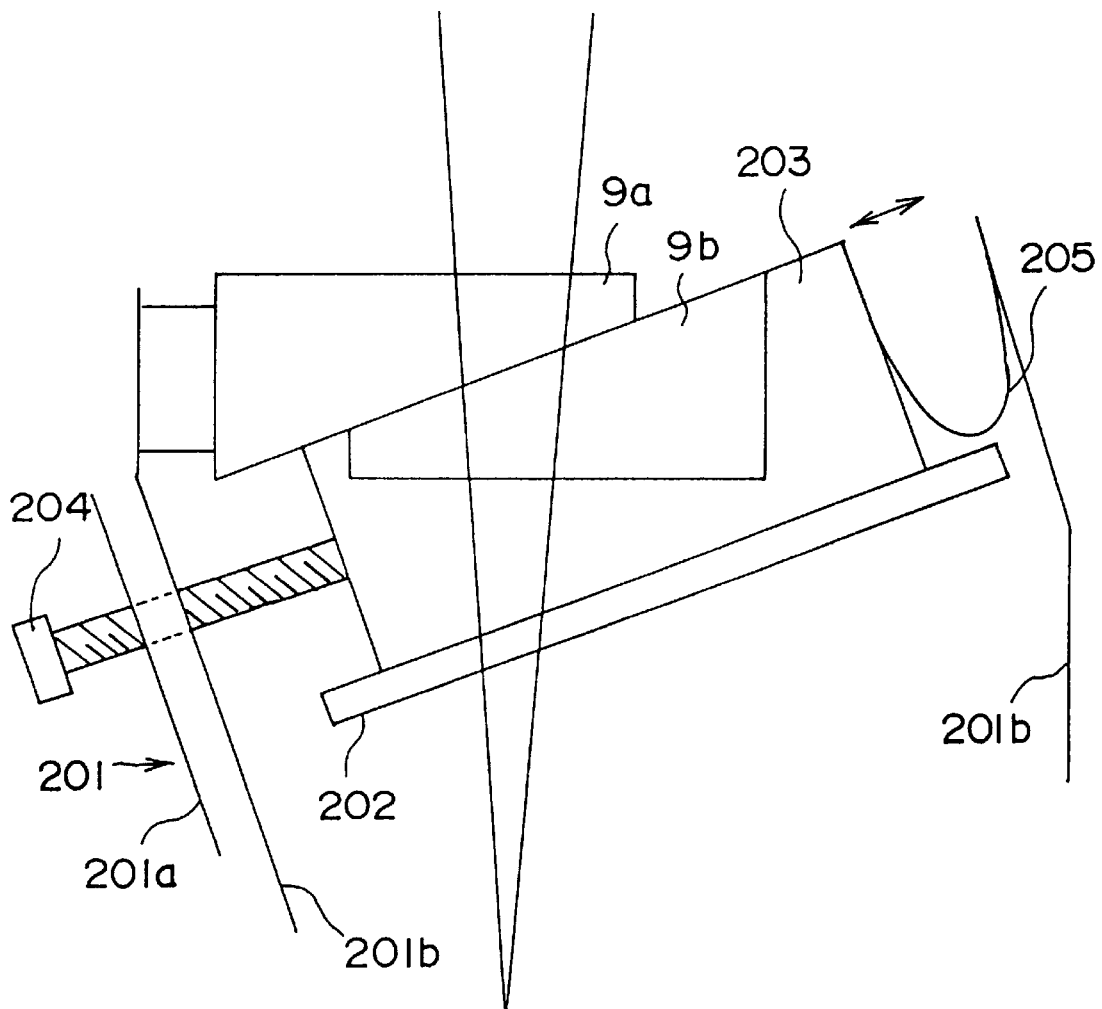
FIG. 13 is a diagram showing an embodiment of the Wollaston prism.

Next, a description will be given of an embodiment of the Wollaston prism 9, by referring to FIG. 13. In FIG. 13, one crystal optical element 9a and a transparent guide 20 are fixed to an optical base 201 which is made up of an outer wall 201a and an inner wall 201b. A transparent holder 203 for holding the other crystal optical element 9b is slidably provided on the transparent guide 202 so as to be movable in directions indicated by arrows. One end of the transparent holder 203 is connected to the inner wall 201b via a spring 205, and a screw 204 which penetrates the optical base 201 is provided on the other end of the transparent holder 203. The relative position of the crystal optical element 9b with respect to the crystal optical element 9a can be variably set by turning the screw 204. Hence, the optical thickness of the overlapping region of the crystal optical elements 9a and 9b can be varied.

Figure 14:
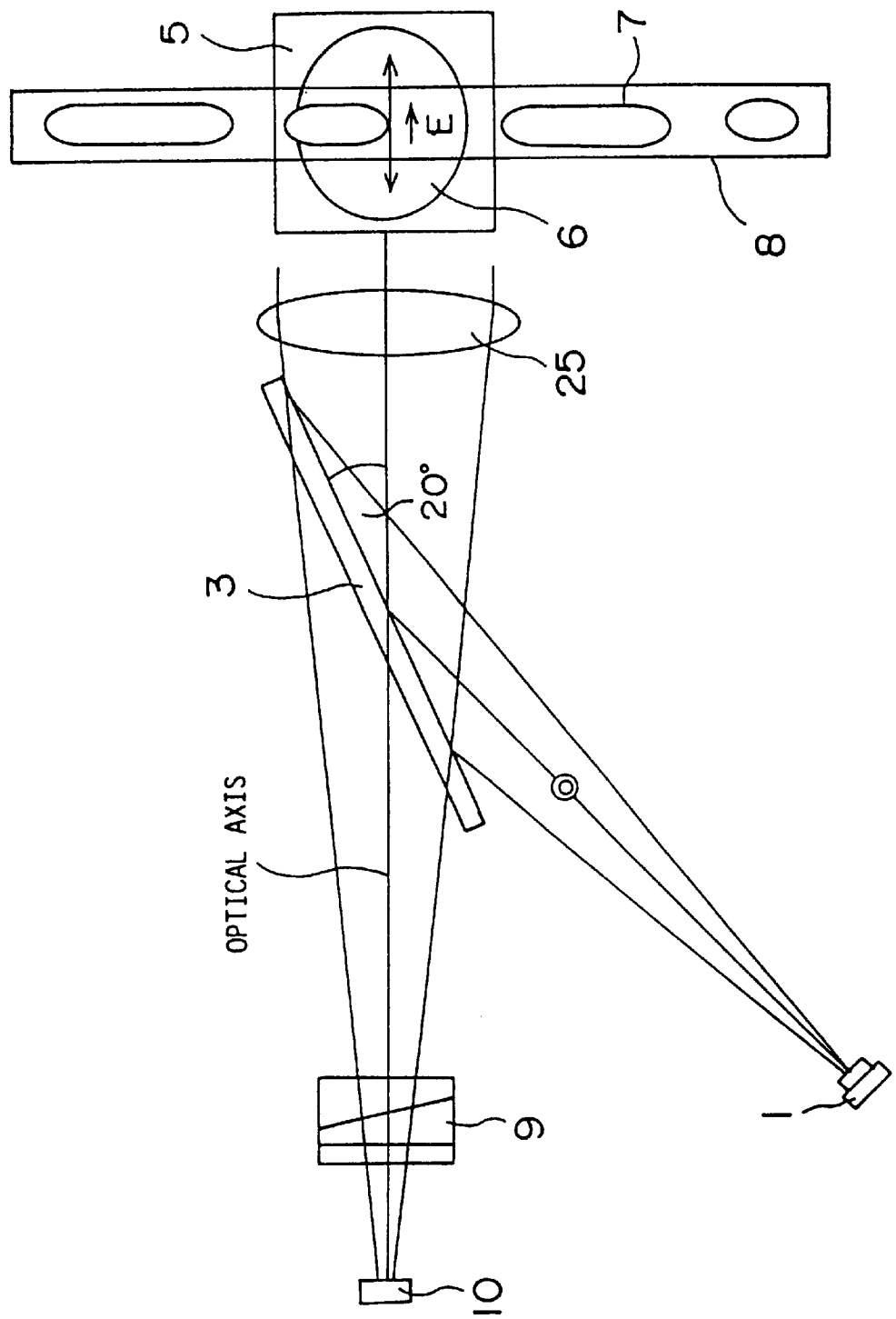
FIG. 14 is a plan view showing the general construction of a second embodiment of the optical information storage unit according to the present invention.
Figure 15:
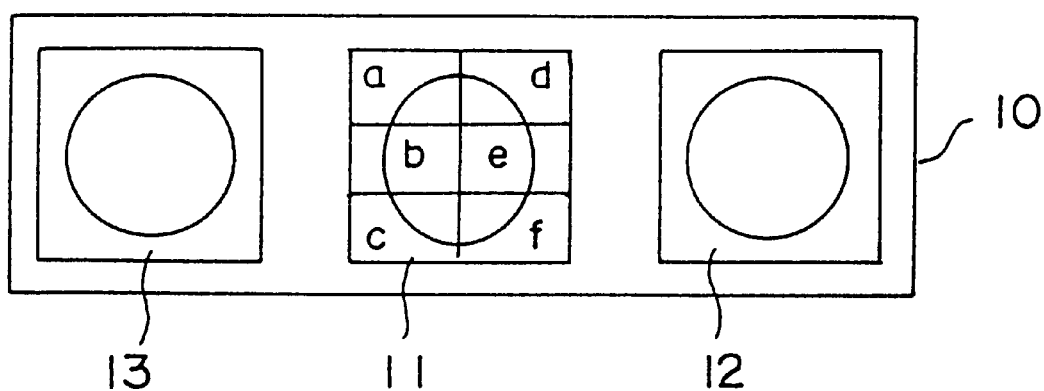
FIG. 15 is a plan view showing the construction of a photodetector.

Next, a description will be given of a second embodiment of the optical information storage unit according to the present invention, by referring to FIGS. 14 and 15. FIG. 14 is a plan view showing the general construction of the second embodiment of the optical information storage unit. In addition, FIG. 15 is a plan view showing the construction of a photodetector 10. In FIGS. 14 and 15, those parts which are the same as those corresponding parts in FIGS. 3 and 7 are designated by the same reference numerals, and a description thereof will be omitted.

As shown in FIG. 14, the condenser lens 2 shown in FIG. 3 is omitted in this embodiment. Accordingly, the divergent bundle of rays emitted from the semiconductor laser 1 is reflected by the polarization beam splitter 3 in a state of the S-polarized light. The polarization beam splitter 3 is inclined by approximately 20° with respect to the optical axis. In other words, a center of the bundle of rays has an incident angle of approximately 70° with respect to the optical axis. In addition, the incident angle of the divergent bundle of rays incident to the polarization beam splitter 3 is set to fall within approximately 65° to approximately 75°.

The bundle of rays reflected by the polarization beam splitter 3 is supplied to a collimator lens 25 and converted into parallel rays. The parallel rays from the collimator lens 25 are reflected by the mirror 5 and supplied to the objective lens 6. The objective lens 6 converges the parallel rays to a diffraction limit, so as to irradiate the track 8 formed on the recording surface of the magneto-optic recording medium and record the magnetic domain 7 on the track 8 or, to irradiate the track 8 and reproduce the magnetic domain 7 recorded on the track 8. In this embodiment, a magneto-optic disk is also used as the magneto-optic recording medium.

The bundle of rays reflected by the track 8 again passes through the objective lens 6 and the collimator lens 25, and is transmitted through the polarization beam splitter 3 depending on the polarization characteristic of the polarization beam splitter 3. The bundle of rays transmitted through the polarization beam splitter 3 is transmitted through the Wollaston prism 9 which is inclined with respect to a plane which is perpendicular to the incident surface of the polarization beam splitter 3 and is includes the optical axis. This Wollaston prism 9 is arranged in obliquely along a plane which is perpendicular to the paper and includes the optical axis. The bundle of rays transmitted through the Wollaston prism 9 is supplied to the photodetector 10.

In FIG. 15, the photodetector 10 includes a 6-part detector 11, a detector 12, and a detector 13. The P-polarized light component and the S-polarized light component having mutually perpendicular electrical vectors are respectively supplied to the detectors 12 and 13. On the other hand, the P-polarized light component and the S-polarized light component having mutually perpendicular electrical vectors, and the mixed light component in which the P-polarized light component and the S-polarized light component coexist, are supplied to the 6-part detector 11 which is arranged at a central portion of the photodetector 10. The 6-part detector 11 includes 6 detector parts a through f. The focal error signal and the tracking error signal are generated based on the output detection signals of the detector parts a through f of the 6-part detector 11, similarly to the first embodiment. In addition, the magneto-optic signal is generated based on the output detection signals of the detectors 12 and 13.

In the first embodiment described above, the polarization beam splitter 3 is arranged between the condenser lens 2 and the condenser lens 4, and thus, the convergent point due to the semiconductor laser 1 and the condenser lens 4 does not become a conjugate point. On the other hand, according to this second embodiment, no condenser lens 2 is provided. For this reason, the convergent point due to the semiconductor laser 1 and the collimator lens 25 becomes a conjugate point in this second embodiment. For this reason, this second embodiment can satisfactorily adjust the focal offset without having to set the offset adjustment quantity of the Wollaston prism 9 to a large value. In other words, since the offset adjustment quantity of the Wollaston prism 9 is proportional to the amount of change in the thickness of the Wollaston prism 9, the Wollaston prism 9 itself would have to be made thick and wide if the offset adjustment quantity were set to a large value, thereby making the Wollaston prism 9 expensive. Therefore, this second embodiment is particularly effective in cases such as when the light emission output of the semiconductor laser 1 is sufficiently large and the data transfer speed is the important factor, and when the light emission output of the semiconductor laser 1 is not large but a large recording laser power is not necessary because the recording and reproduction is carried out at a low linear velocity.

In the first and second embodiments described above, the focal error signal is generated by employing the SSD method. However, the focal error signal may of course be generated by employing other methods such as the astigmatism method.

Figure 16:
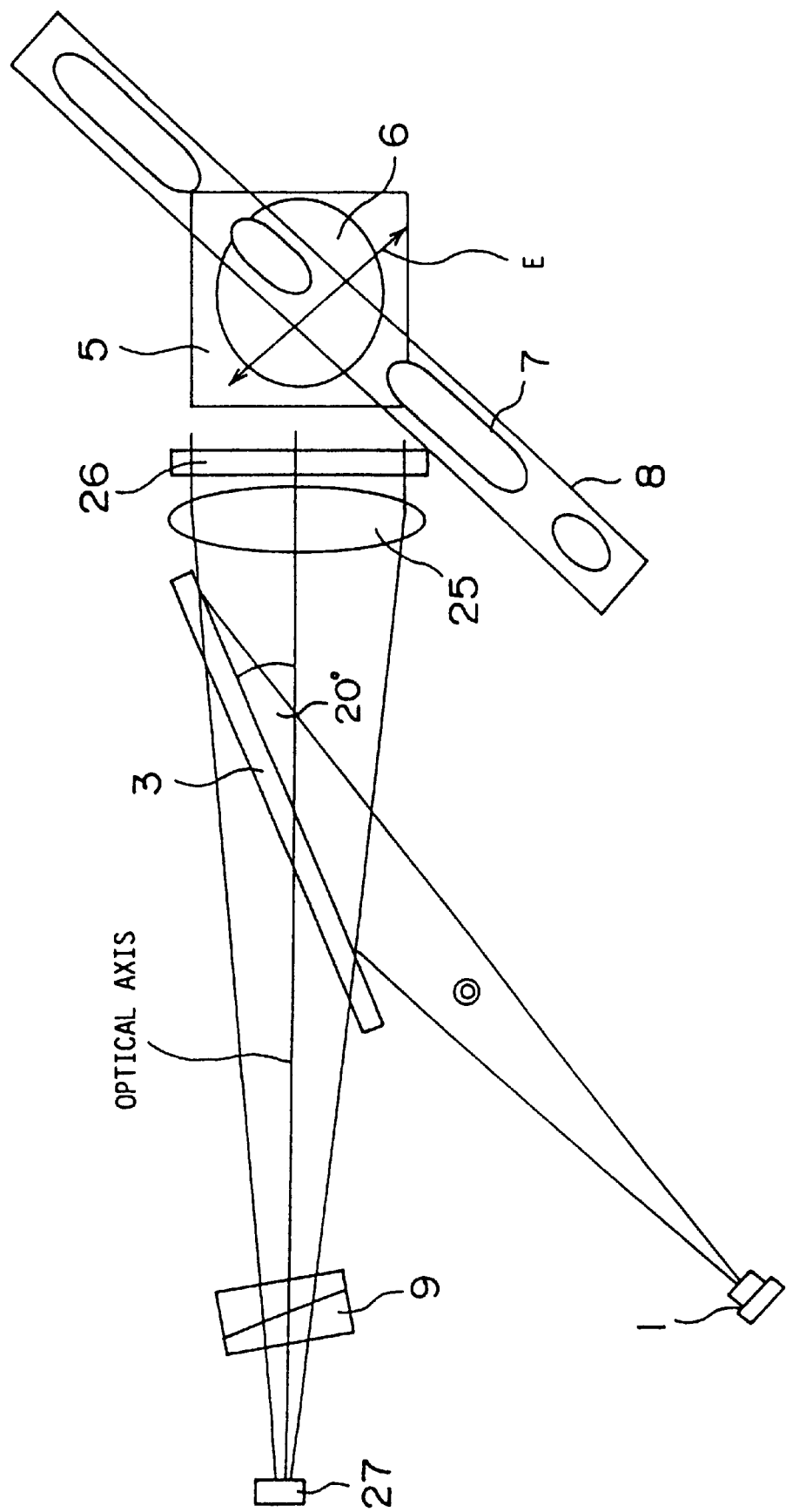
FIG. 16 is a plan view showing the general construction of a third embodiment of the optical information storage unit according to the present invention.
Figure 17:
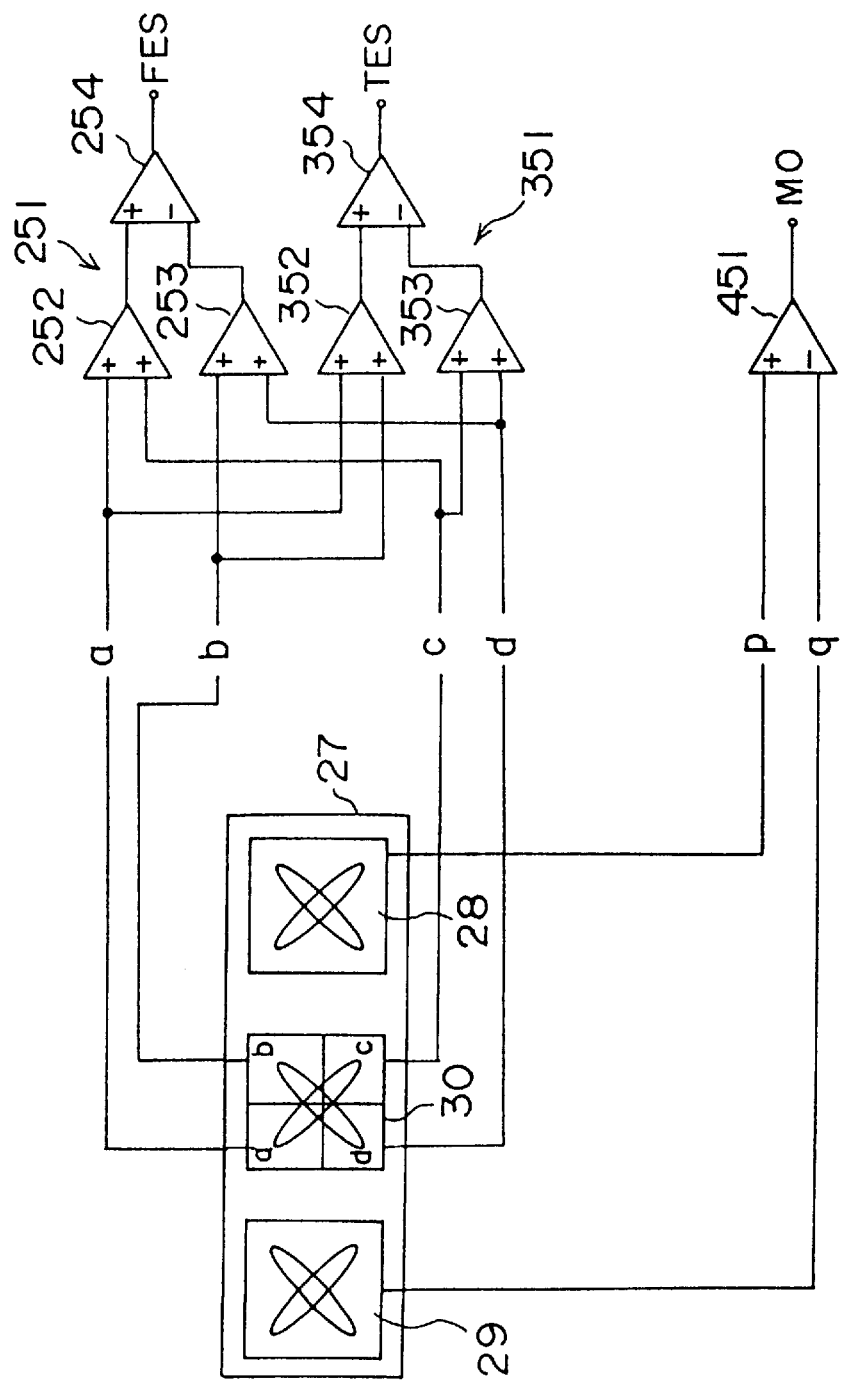
FIG. 17 is a diagram showing the construction of a photodetector together with an important part of a detection system.

Next, a description will be given of a third embodiment of the optical information storage unit according to the present invention, by referring to FIGS. 16 and 17. FIG. 16 is a plan view showing the general construction of the third embodiment of the optical information storage unit. In addition, FIG. 17 is a diagram showing the construction of a photodetector together with an important part of a signal detection system. In FIG. 16, those parts which are the same as those corresponding parts in FIG. 14 are designated by the same reference numerals, and a description thereof will be omitted. This embodiment generates the focal error signal by employing the astigmatism method.

In FIG. 16, the divergent bundle of rays emitted from the semiconductor laser 1 is reflected by the polarization beam splitter 3 in a state of the S-polarized light. The optical axis is approximately 45° with respect to a tangent to the track 8 on the magneto-optic recording medium, and the polarization beam splitter 3 is inclined by approximately 20° with respect to the optical axis. In other words, a center of the bundle of rays has an incident angle of approximately 70° with respect to the optical axis. In addition, the incident angle of the divergent bundle of rays incident to the polarization beam splitter 3 is set to fall within approximately 65° to approximately 75°.

The bundle of rays reflected by the polarization beam splitter 3 is supplied to the collimator lens 25 and converted into parallel rays. The parallel rays from the collimator lens 25 are supplied to a ½ wave plate 26, and the plane of polarization rotates by approximately 45° and an electrical vector E of the bundle of rays becomes perpendicular or parallel to the track 8. The parallel rays passed through the ½ wave plate 26 are reflected by the mirror. 5 and supplied to the objective lens 6. The objective lens 6 converges the parallel rays to a diffraction limit, so as to irradiate the track 8 formed on the recording surface of the magneto-optic recording medium and record the magnetic domain 7 on the track 8 or, to irradiate the track 8 and reproduce the magnetic domain 7 recorded on the track 8. In this embodiment, a magneto-optic disk is also used as the magneto-optic recording medium.

The bundle of rays reflected by the track 8 again passes through the objective lens 6, the ½ wave plate 26 and the collimator lens 25, and is transmitted through the polarization beam splitter 3 depending on the polarization characteristic of the polarization beam splitter 3. The bundle of rays transmitted through the polarization beam splitter 3 is transmitted through the Wollaston prism 9 which is inclined with respect to a plane which is perpendicular to the incident surface of the polarization beam splitter 3 and is includes the optical axis. Unlike in the first and second embodiments described above, this Wollaston prism 9 is arranged in obliquely along the incident surface of the polarization beam splitter 3, that is, obliquely along the paper in FIG. 16. The bundle of rays transmitted through the Wollaston prism 9 is supplied to a photodetector 27.

In FIG. 17, the photodetector 27 includes a 4-part detector 30, a detector 28, and a detector 29. The P-polarized light component and the S-polarized light component having mutually perpendicular electrical vectors are respectively supplied to the detectors 28 and 29. On the other hand, the P-polarized light component and the S-polarized light component having mutually perpendicular electrical vectors, and the mixed light component in which the P-polarized light component and the S-polarized light component coexist, are supplied to the 4-part detector 30 which is arranged at a central portion of the photodetector 27. The 4-part detector 30 includes 4 detector parts a through d. The focal error signal and the tracking error signal are generated based on the output detection signals of the detector parts a through d of the 4-part detector 30. In addition, the magneto-optic signal is generated based on the output detection signals of the detectors 28 and 29.

More particularly, a focal error detection system 251 includes operational amplifiers 252 and 253, and a differential amplifier 254. The operational amplifier 252 adds output detection signals a and c of the detector parts a and c of the 4-part detector 30, and supplies an added result to the differential amplifier 254. The operational amplifier 253 adds output detection signals b and d of the detector parts b and d of the 4-part detector 30, and supplies an added result to the differential amplifier 254. The differential amplifier 254 subtracts the added result received from the operational amplifier 253 from the added result received from the operational amplifier 252, and generates a focal error signal (FES) described by (a+c)−(b+d).

On the other hand, a tracking error detection system 351 includes operational amplifiers 352 and 353, and a differential amplifier 354. The operational amplifier 352 adds output detection signals a and b of the detector parts a and b of the 4-part detector 30, and supplies an added result to the differential amplifier 354. The operational amplifier 353 adds output detection signals c and d of the detector parts c and d of the 4-part detector 30, and supplies an added result to the differential amplifier 354. The differential amplifier 354 subtracts the added result received from the operational amplifier 353 from the added result received from the operational amplifier 352, and generates a tracking error signal (TES) described by (a+b)−(c+d).

In a magneto-optic signal detection system, a differential amplifier 451 subtracts an output detection signal q of the detector 29 from an output detection signal p of the detector 28, and generates a magneto-optic signal (MO) similarly to the first and second embodiments described above.

By combining the Wollaston prism 9 which is arranged obliquely along the paper and the polarization beam splitter 3, it is possible to obtain an approximately ideal astigmatism free of coma aberration. As a result, a leak of the push-pull signal to the focal error signal is extremely small, and this embodiment can obtain stable focal error signal ad tracking error signal.

As described above, the present invention eliminates the astigmatism generated by the plate-shaped polarization beam splitter by obliquely arranging the Wollaston prism. In addition, since the 2 crystal optical elements forming the Wollaston prism are movably provided relative to each other, it is possible to arbitrarily adjust the overlapping portion of the 2 crystal optical elements. Therefore, the optical path length traveled by the light being transmitted through the Wollaston prism can be varied, so that the offset adjustment of the focal error can be made without the need to provide a special optical element.

Generally, the offset of the focal error is adjusted by moving a concave lens or a convex lens in a direction along the optical axis. But in this case, the number of optical parts required increases, and positions where lenses and the like are to be arranged become determined almost automatically, thereby introducing a large number of restrictions with respect to the design. In addition, if the position of the lens changes in the direction along the optical axis and in a plane parallel to the optical axis due to a temperature change, the focal error reacts extremely sensitively to this change, and in some cases, a large offset exceeding the adjustable limit may be generated.

But according to the present invention, the offset adjustment of the focal error is made by use of the Wollaston prism. For this reason, the focal error is independent of the position of the Wollaston prism in the direction along the optical direction, and is completely unaffected by a change in the position of the Wollaston prism in a plane perpendicular to the optical axis. Therefore, it is possible to generate an extremely stable focal error signal.

In addition, the present invention arranges the entire Wollaston prism in a position inclined in an appropriate direction, so that it is possible to cope with various focal error detection methods and to satisfactorily adjust the offset of the focal error.

Further, the present invention is not limited to these embodiments, but various variations and modifications may be made without departing from the scope of the present invention.

What is claimed is:

1. An optical information storage unit comprising:
   a light source;
   a plate-shaped polarization beam splitter reflecting and irradiating a bundle of rays emitted from said light source onto a recording surface of a recording medium; and
   an optical element, comprising a Wollaston prism, receiving a convergent light reflected by the recording surface and passed through said polarization beam splitter, and having an infinite focal distance with a variable convergent point for the convergent light,
   said Wollaston prism being inclined with respect to a plane of incidence of said polarization beam splitter, so that astigmatism generated by said polarization beam splitter is eliminated by said Wollaston prism.

2. The optical information storage unit as claimed in claim 1, which further comprises:
   first condenser means for reducing a diverging angle of a divergent bundle of rays emitted from said light source and making said polarization beam splitter reflect the divergent bundle of rays.

3. The optical information storage unit as claimed in claim 2, which further comprises:
   second condenser means for converting the bundle of rays reflected by said polarization beam splitter into parallel rays; and
   an objective lens converging the parallel rays to a diffraction limit,
   said first condenser means comprising a first condenser lens having a first numerical aperture,
   said second condenser means comprising a second condenser lens having a second numerical aperture smaller than the first numerical aperture.

4. The optical information storage unit as claimed in claim 3, wherein said polarization beam splitter comprises a plate-shaped polarization beam splitter.

5. The optical information storage unit as claimed in claim 2, wherein said polarization beam splitter comprises a plate-shaped polarization beam splitter.

6. The optical information storage unit as claimed in claim 1, which further comprises:
   means for generating a focal error signal by a spot size detection method based on the light passed through said Wollaston prism.

7. The optical information storage unit as claimed in claim 1, wherein said Wollaston prism is made up of two crystal optical elements.

8. The optical information storage unit as claimed in claim 7, wherein said Wollaston prism is inclined with respect to a plane which is perpendicular to a plane of incidence of said polarization beam splitter and includes an optical axis along which the bundle of rays travels.

9. The optical information storage unit as claimed in claim 7, wherein said Wollaston prism is inclined with respect to a light incident surface of said polarization beam splitter.

10. The optical information storage unit as claimed in claim 7, wherein said polarization beam splitter comprises a plate-shaped polarization beam splitter.

11. An optical information storage unit comprising:
    a light source;
    a polarization beam splitter reflecting and irradiating a bundle of rays emitted from said light source onto a recording surface of a recording medium; and
    an optical element receiving a convergent light reflected by the recording surface and passed through said polarization beam splitter, and having an infinite focal distance with a variable convergent point for the convergent light,
    said optical element comprising a Wollaston prism made up of two crystal optical elements which are movable relative to each other so that a traveling distance of the bundle of rays passing through said Wollaston prism is variable.

12. The optical information storage unit as claimed in claim 11, wherein said polarization beam splitter comprises a plate-shaped polarization beam splitter.

13. The optical information storage unit as claimed in claim 11, which further comprises:
   means for generating a focal error signal by a spot size detection method based on the light passed through said Wollaston prism.

14. The optical information storage unit as claimed in claim 11, wherein said Wollaston prism is inclined with respect to a plane which is perpendicular to a plane of incidence of said polarization beam splitter, so that astigmatism generated by said polarization beam splitter is eliminated by said Wollaston prism.

* * * * *

UNITED STATES PATENT AND TRADEMARK OFFICE
CERTIFICATE OF CORRECTION

PATENT NO. : 6,094,412
DATED : July 25, 2000
INVENTOR(S) : Yasuaki Morimoto

It is certified that error appears in the above-indentified patent and that said Letters Patent is hereby corrected as shown below:

Column 12, lines 26-28, please delete Claim 4.

Column 12, lines 29-31, please delete Claim 5.

Column 12, lines 45-47, please delete Claim 9.

Column 13, lines 1-3, please delete Claim 12.

Signed and Sealed this

Twenty-ninth Day of May, 2001

Attest:

NICHOLAS P. GODICI

*Attesting Officer*  *Acting Director of the United States Patent and Trademark Office*